Oct. 26, 1965  H. W. BAKER  3,214,256
METHODS OF AND APPARATUS FOR TOUGHENING
CURVED SHEETS OF GLASS
Filed June 18, 1963  2 Sheets-Sheet 1

Inventor
Henry Wellstood Baker
By
Morrison, Kennedy & Campbell
Attorneys

Oct. 26, 1965  H. W. BAKER  3,214,256
METHODS OF AND APPARATUS FOR TOUGHENING
CURVED SHEETS OF GLASS
Filed June 18, 1963  2 Sheets-Sheet 2
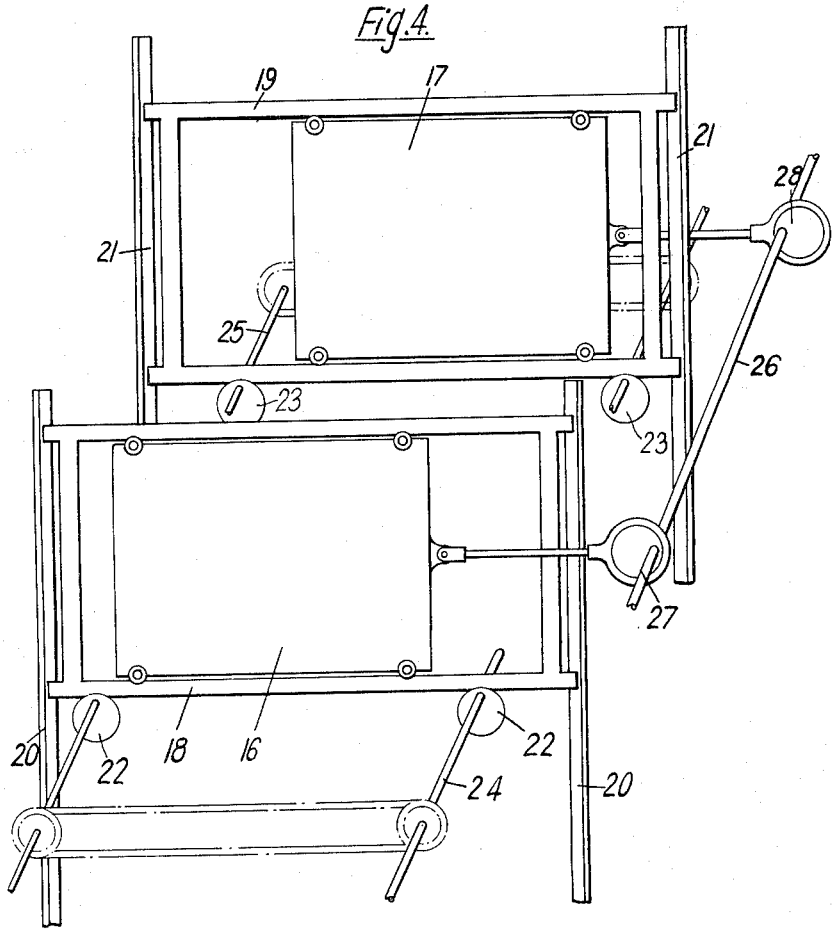
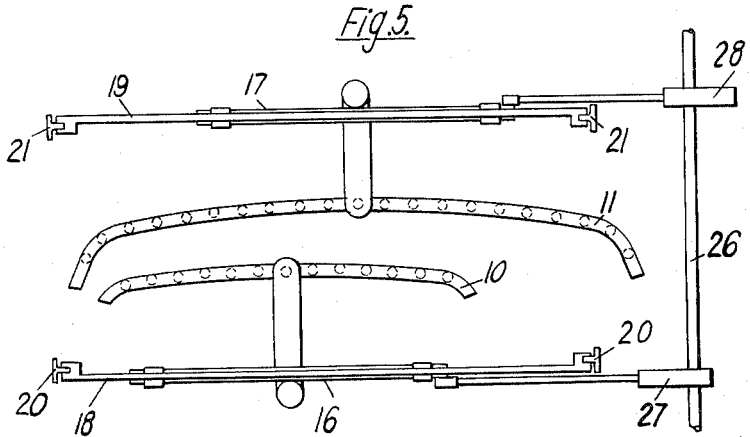
Inventor
Henry Wellstood Baker
By
Morrison, Kennedy & Campbell
Attorneys United States Patent Office 3,214,256
Patented Oct. 26, 1965

3,214,256
METHODS OF AND APPARATUS FOR TOUGHENING CURVED SHEETS OF GLASS
Henry Wellstood Baker, Birmingham, England, assignor to Pilkington Brothers Limited, Liverpool, England, a corporation of Great Britain
Filed June 18, 1963, Ser. No. 288,651
Claims priority, application Great Britain, June 21, 1962, 23,944/62
11 Claims. (Cl. 65—114)

This invention relates to methods of and apparatus for toughening curved sheets of glass.

In the conventional process for toughening sheets of glass the glass sheet is heated to a temperature above the strain point of the glass in a furnace and is then withdrawn from the furnace and subjected to the quenching action of a chilling fluid which is directed at both surfaces of the glass sheet.

In one well-known method of toughening glass sheets the glass is suspended in the furnace by tongs holding its top edge and is then withdrawn from the furnace upwards into a position between opposed quenching units or frames composed of a framework of pipes carrying compressed air and provided with orifices on their opposed surfaces. Jets of air are directed through the orifices against the heated glass sheet causing the glass to cool rapidly to a temperature below the strain point of the glass thus producing the state of stress in the cooled glass sheet which state of stress is known as "toughened."

In many applications of toughened glass the glass sheet is curved or bent, for example, for use in automobiles or aircraft, and when a glass sheet is to be bent the vertical movement between the furnace and the quenching frames may conveniently be interrupted and the glass, when stationary, pressed between dies in order to give the glass the desired curvature, after which it is further raised into position between the quenching frames and quenched.

As used in this specification the term "curved" in relation to a glass sheet includes any bending of the glass sheet so that the glass sheet is not strictly flat whether bending occurs over the whole length of the glass sheet so that the whole sheet is bent into a curve, or whether only a portion of the glass sheet is deformed, for example, to form one or more bent-round end portions.

During the quenching of a heated glass sheet it is desired that the chilling fluid, for example, the jets of air, shall be distributed as uniformly as possible over the surfaces of the heated glass sheet and it is therefore customary to move the quenching frames in a periodic motion, for example a circular motion in a plane parallel with the glass if the glass is flat or parallel with the general plane of the glass if the glass sheet is curved. In the case of a curved glass sheet the plane is thus the plane through a central portion of the glass sheet or if the glass sheet is symmetrically curved a plane tangential to the central portion of the curved glass sheet.

When the curvature of the glass sheet being toughened is such that one or both ends of the glass are turned through a substantial angle, which may, for example, be 30° or 45° or more from the original plane of the flat glass, the quenching frames are shaped to adopt in plan view curves parallel to the curves of the glass sheet itself. The orifices through which the chilling fluid is directed at the heated glass sheet are thus approximately equi-distant from the glass sheet over the whole surface of both faces of the glass. However, when such a pair of quenching frames is given periodic motion having a reciprocating component in a direction parallel to the chord to the mean path of the generatrix of the surface of the glass sheet, for example the circular motion referred to above, the ends of the quenching frames will alternately recede from and approach the end portions of the glass sheet. The jets of air or other chilling fluid issuing from the opposed quenching frames will then produce a net unbalanced force on the end portions of the curved glass sheet and will also produce a measure of inequality in the rate of abstraction of heat from the opposed surfaces of the end portions of the glass sheet.

The phenomenon which is described will be further understood from the following description in relation to FIGURE 1 of the accompanying drawings.

FIGURE 1 shows a curved glass sheet 1 having end portions 2 and 3 at a substantial angle to the general plane of the glass sheet before bending, which plane is indicated approximately by the central portion of the glass sheet between the two end portions 2 and 3. In FIGURE 1 the glass sheet 1 is shown in plan view in position between opposed quenching frames 4 and 5 which quenching frames are being moved in similar circular motions in planes parallel to the plane adopted by the glass sheet 1 before bending. FIGURE 1 shows the quenching frames 4 and 5 at one end of the motion imparted to them in a direction parallel to the chord to the mean path of the generatrix of the surface of the glass sheet 1. In the case of a glass sheet 1 suspended between opposed quenching frames as shown in FIGURE 1 the chord to the mean path of the generatrix of the surface of the glass is substantially horizontal as seen in FIGURE 1.

In this case when the end 6 of the quenching frame 5 is close to the end portion 3 of the glass sheet 1 the corresponding end 7 of the quenching frame 4 is at a distance from the end portion 3 of the glass sheet 1 so that the pressure exerted by the chilling air on the end portion 3 of the glass sheet 1 tends to move the glass sheet 1 to the right as seen in FIGURE 1 or even to set up oscillations about the support for the glass sheet 1.

At the same time the other end 8 of the quenching frame 4 has approached close to the end portion 2 of the glass sheet 1 while the end 9 of the quenching frame 5 has been moved away from the end portion 2 of the glass sheet 1, so that there is another force tending to move the glass sheet 1 to the right at the left-hand end of the glass sheet.

When the two quenching frames have been moved 180° in their circular motion the positions will be reversed and there will be forces acting on the end portions 2 and 3 of the curved glass sheet 1 tending to move the glass sheet 1 to the left as seen in FIGURE 1. The suspended curved glass sheet 1 is thus caused to swing upon its supports as a result of the forces set up on the end portions of the glass sheet during the quenching action.

According to the present invention there is provided a method of toughening a curved glass sheet by subjecting both faces of the heated glass sheet to the quenching action of jets of chilling fluid, the pressure of the jets of chilling fluid being varied by a periodic motion of the jets, for example a circular motion, characterised by the periodic motion of the jets being arranged such that the pressure of the chilling fluid on opposed curved surfaces of the glass are maintained substantially in balance, whereby any tendency of the chilling fluid to move the glass sheet during the quenching action is substantially eliminated.

Conveniently the pressure of the chilling fluid on the opposed curved surfaces of the glass is maintained substantially in balance during the quencing action by mounting the opposed quenching frames on separate carriages so that they may each be given periodic motions in the direction parallel to the chord to the mean path of the generatrix of the surface of the glass and the respective periodic motions in this direction may be 180° out of phase.

According to this aspect, therefore, the present invention provides a method of toughening a curved glass sheet by subjecting both faces of the heated glass sheet to the quenching action of jets of chilling fluid, the jets of chilling fluid being moved in a motion having a reciprocatory component in a direction substantially parallel to the chord to the mean path of the generatrix of the surface of the glass sheet to spread the chilling fluid over the surfaces of the heated glass sheet, characterised in that the motion imparted to the jets on one side of the glass sheet is 180° out of phase with the motion imparted to the jets on the other side of the glass sheet in the direction substantially parallel to the said chord, whereby any tendency of the chilling fluid to move the glass sheet during the quenching action is substantially eliminated.

When the sheet of curved glass being toughened by a method according to the present invention is a glass sheet for an automobile, this may be a large glass sheet curved at one end only, for example a curved glass sheet which would form half of the windscreen of a coach. From this aspect, therefore, the present invention provides a method of toughening a sheet of glass having at least one curved or sharply bent-round end-portion by subjecting both faces of the heated glass sheet to the quenching action of jets of chilling fluid, the jets of chilling fluid being moved in a periodic motion to spread the chilling fluid over the surface of the heated glass sheet, characterised in that, as the jets on one side of an end-portion of the glass sheet are moved nearer to the glass in said periodic motion, so the jets on the other side of the said end-portion are also moved nearer to the glass whereby any tendency of the chilling fluid to move the glass sheet during the quenching action is substantially eliminated.

The method according to the present invention has particular application in the toughening of a curved glass sheet for use as a windscreen or backlight of the type having a substantially linear central portion and sharply bent-round end-portion. This type of glass sheet is commonly known as a "wrap-round" wind-screen or backlight and accordingly from this aspect the present invention comprises a method of toughening a curved glass sheet having a substantially linear central portion and sharply bent-round end portions, for example a windscreen or a backlight for an automobile, by subjecting both faces of the heated glass sheet to the action of jets of chilling fluid, characterised in that, as the jets on one side of one end portion of the glass sheet are moved nearer to the said end portion by movement of the jets in a direction parallel to the said linear central portion, so the jets on the other side of the said one end portion are also moved nearer to the said end portion, whereby any tendency of the chilling fluid to move the glass sheet in a direction parallel to the said linear central portion is substantially eliminated. At the same time the jets on both sides of the other end portion of the glass sheet are moved away from the said other end portion and again any tendency of the chilling fluid to move the glass sheet in a direction parallel to the said linear central portion is substantially eliminated.

The present invention has particular application in methods of toughening curved glass sheets wherein the glass sheet is suspended between a pair of opposed quenching frames and accordingly the present invention further provides a method of toughening a curved glass sheet including the steps of suspending the heated glass sheet between a pair of opposed quenching frames, subjecting both faces of the heated glass sheet to the action of jets of chilling fluid emanating from said quenching frames, the quenching frames including the said jets being moved in a periodic motion having a reciprocatory component in a direction parallel to the chord to the mean path of the generatrix of the glass surface, characterized in that, as the jets on one side of the curved glass sheet are moved nearer to any given part of the glass sheet by movement of the jets in a direction parallel to the said chord, so the jets on the other side of the glass sheet are also moved nearer to the corresponding given part of the glass sheet, whereby any tendency of the chilling fluid to rock the suspended glass sheet in a direction parallel to the said chord is substantially eliminated.

Conveniently the jets on both sides of the curved glass sheet are moved in periodic motions having corresponding components in a direction substantially parallel to the mean direction of the generatrix of the glass surface.

The present invention also comprehends apparatus for toughening a curved glass sheet comprising quenching means for directing chilling fluid onto the surfaces of a heated curved glass sheet, supporting means for supporting a heated curved glass sheet in position for quenching by the said quenching means, and driving means for imparting a periodic motion to the said quenching means, the periodic motion imparted to the quenching means directing chilling fluid onto the curved surfaces of the glass sheet being such that the pressure of the chilling fluid on opposed curved surfaces of the glass sheet are maintained substantially in balance.

Preferably, however, the quenching means directing chilling fluid on to the curved surfaces of the glass sheet are integral with the portions of the quenching means directing chilling fluid onto any linear portions of the curved glass sheet and from this aspect, therefore, the present invention provides apparatus for toughening a curved glass sheet comprising opposed quenching frames having means for directing jets of chilling fluid onto the surfaces of a heated curved glass sheet supported therebetween, supporting means for supporting a heated curved glass sheet between the said opposed quenching frames, and driving means for imparting to the opposed quenching frames a motion having a reciprocatory component in a direction substantially parallel to the chord to the mean path of the generatrix of the surface of the glass sheet such that, as the jets on one side of a given portion of the glass sheet are moved nearer to the said portion by movement of the jets in a direction parallel to the said chord, so the jets on the other side of the said given portion are also moved nearer to the said given portion of the glass sheet and any tendency of the jets of chilling fluid to move the glass sheet in a direction parallel to the said chord is substantially eliminated.

When a curved glass sheet which would form half of the windscreen of a coach is being toughened, the present invention provides apparatus for toughening a curved glass sheet having a substantially linear main portion and at least one curved or sharply bent-around end-portion, the apparatus comprising opposed quenching frames, each including a plurality of jets from which a chilling fluid may be directed against the surfaces of a heated glass sheet positioned therebetween, supporting means for supporting a heated glass sheet between the said quenching frames, and driving means for imparting to the opposed quenching frames a periodic motion such that as the jets on one side of a given portion of the glass sheet are moved nearer to the said portion in said periodic motion, so the jets on the other side of the said given portion are also moved nearer the said given portion of the glass sheet and any tendency of the jets of chilling fluid to move the glass sheet is substantially eliminated.

More particularly the present invention provides apparatus for toughening a curved glass sheet having a substantially linear central portion and sharply bent-round end-portions, for example a windscreen or backlight, the apparatus comprising opposed quenching frames, each including a plurality of jets from which a chilling fluid may be directed against the surfaces of a heated glass sheet positioned therebetween, suspending means for hanging a heated glass sheet in a position between the said quenching frame, and driving means for imparting to the opposed quenching frames a motion having a component in a direction parallel to the said linear central portion, so that the jets on the one side of one end portion of the glass sheet are moved nearer to the said end portion, and the jets on the other side of the said end portion are at the same time moved nearer to the said end portion whereby any tendency of the jets to move the glass sheet in a direction parallel to the said linear central portion is substantially eliminated.

Preferably the said driving means is arranged to impart to the opposed quenching frames motions in the direction, which motions are 180° out of phase.

Advantageously the opposed quenching frames have a configuration similar to the configuration of the glass sheet being quenched. In general the configuration of the glass sheet being quenched is such that the sheet has a curvature resultant in at least one end of the glass sheet being tangential to a plane not less than 30° from the original plane of the glass sheet. The plane tangential to the end of the glass sheet may make an angle of 45° or more with the original plane of the glass sheet.

Although the driving means may impart to the quenching frames only the motion which results in the jets on the one side of one end portion of the windscreen being moved nearer to the said end portion and the jets on the other side of the said end portion at the same time being moved nearer to the said end portion, preferably movement is also imparted to the quenching frames in a direction at right angles to this direction, that is to say in the general case driving means additionally impart to the opposed quenching frames reciprocatory movement in a direction parallel to the mean direction of the generatrix of the glass surface.

When the driving means impart to the opposed quenching frames movement in two directions these movements may be of equal amplitude in the said two directions.

Advantageously, however, the said driving means impart to the opposed quenching frames a movement in the direction parallel to the mean direction of the generatrix of the glass surface of greater amplitude than the amplitude of the movement in the direction parallel to the chord to the mean path of the said generatrix.

If desired, the driving means may impart to the quenching frames movements of different frequencies in the two directions.

The invention will be more clearly understood from the following detailed description, made purely by way of example, taken in conjunction with FIGURES 2 to 5 of the accompanying drawings, in which:

FIGURE 4 is a perspective view of one embodiment of driving means for moving quenching frames according to the invention, and FIGURE 5 is a plan view of apparatus according to the invention for toughening a suspended sheet of glass.

In the drawings like reference numerals designate the same or similar parts.

Figure 1:
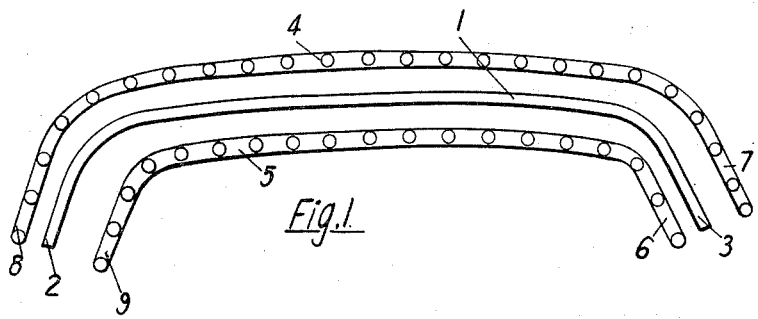
Figure 2:
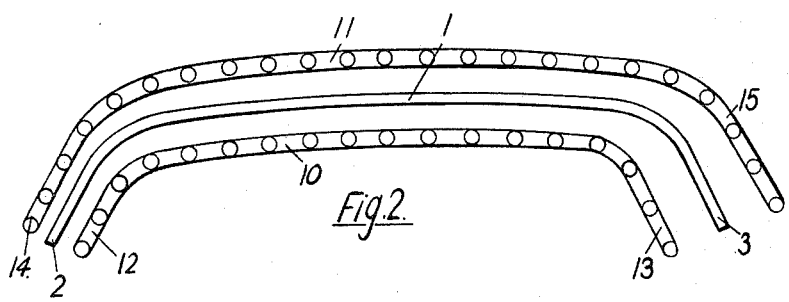
FIGURES 2 and 3 illustrate the principle of the invention.
Figure 3:
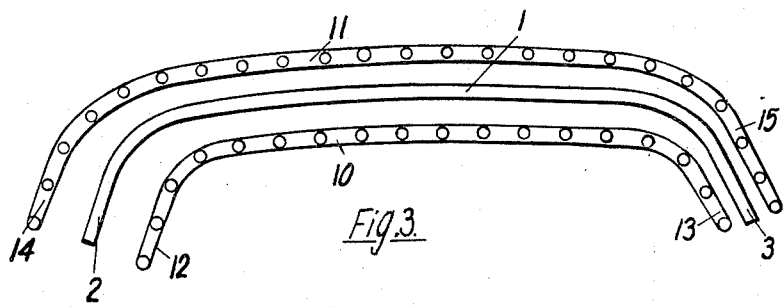

Referring first to FIGURES 2 and 3 of the accompanying drawings, there is shown a curved glass sheet 1 having a substantially linear central portion and bent-round end portions 2 and 3, the glass sheet 1 being of the type known as a "wrap-round" windscreen. Similar shapes of curved glass sheet are also used as backlights in automobiles. In FIGURES 2 and 3 the curved glass sheet 1 is shown positioned between opposed quenching frames 10 and 11 having a configuration similar to the configuration of the glass sheet. Consequently the ends 12, 13, 14 and 15 of the quenching frames 10 and 11 have a curvature such that each end of the quenching frame is tangential to a plane at an angle of approximately 70° to the original plane of the glass sheet 1, which is the plane adopted by the substantially linear central portion of the glass sheet.

The opposed quenching frames 10 and 11 are arranged to be moved in a direction substantially parallel to the said linear central portion which is also a direction substantially parallel to the chord to the mean path of the generatrix of the surface of the glass sheet 1, the movement of the two quenching frames 10 and 11 being substantially 180° out of phase.

Consequently when the quenching frame 10 is moved to the left as shown in FIGURE 2 and the pressure of the chilling fluid, usually air, discharged against the glass sheet 1 from the end 12 of the quenching frame 10 is increased, the opposed quenching frame 11 is moved to the right so that the pressure of the chilling fluid discharged from the end 14 of the quenching frame 11 is also increased and the pressure exerted on the end portion 2 of the curved glass sheet 1 remains substantially balanced. At the same time the ends 13 and 15 of the respective quenching frames will move away from the end portion 3 of the curved glass sheet so that the pressure exerted on this end portion 3 also remains substantially balanced.

FIGURE 3 shows the position of the quenching frames 10 and 11 half a cycle later in their reciprocating motion. As shown in FIGURE 3 the pressures exerted by the chilling fluid on the end portion 3 of the curved glass sheet 1 will have increased but will remain substantially balanced as the ends 13 and 15 of the quenching frames 10 and 11 have both approached the end portion 3 of the glass sheet 1 to substantially the same extent. Similarly, the ends 12 and 14 of the quenching frames 10 and 11 have been moved away from the end portion 2 of the curved glass sheet 1 by substantially the same amount.

Referring now to FIGURE 4, there is shown diagrammatically one method for imparting the desired reciprocating movement to the opposed quenching frames 10 and 11. In the embodiment shown the quenching frames are also given a reciprocating motion in a direction parallel to the mean direction of the generatrix of the glass surface, which for the apparatus indicated in FIGURE 4 will be a vertical direction as the glass sheet would be suspended between opposed quenching frames mounted on the carriages 16 and 17. Consequently the quenching frames are moved in an overall periodic motion.

The carriages 16 and 17 which carry the opposed quenching frames 10 and 11 as shown in FIGURE 5 are arranged for horizontal movement in respective frames 18 and 19 and the frames 18 and 19 are adapted to be moved vertically in runners 20 and 21, the position of the frames 18 and 19 being controlled respectively by cam members 22 and 23.

In operation the cam members 22 and 23, which are mounted eccentrically on driving shafts 24 and 25, are driven by driving means so that both the frames 18 and 19 are moved vertically in synchronism. At the same time a further driving shaft 26 is driven independently so that the discs 27 and 28 which are mounted eccentrically on the driving shaft 26 are also rotated. The discs 27 and 28, however, are mounted eccentrically 180° out of phase on the driving shaft 26 so that the discs 27 and 28 move the carriages 16 and 17 respectively in opposite directions in the frames 18 and 19 as the driving shaft 26 rotates.

The cams 22 and 23 and the discs 27 and 28 are mounted the same distance eccentrically of their respective driving shafts, so that the resultant motion given to the carriages 16 and 17 is a circular motion. This circular motion is arranged to have an amplitude of the same order as the distance between adjacent orifices of the quenching frames.

It will be appreciated that the apparatus described for imparting to the opposed quenching frames a horizontal motion, which is substantially 180° out of phase, is only one of several methods which would readily occur to anyone familiar with the art.

The quenching frames may be driven completely independently, for example one may be driven clockwise while the other is driven anti-clockwise provided that they are sufficiently out of phase in the direction of the length of the curved glass sheet for the forces on the two sides of the curved glass sheet to be substantially balanced. Also the quenching frames which have been indicated in the drawings are tubular types of blowing frames using compressed air to quench a heated glass sheet suspended vertically from one edge, but the invention is equally applicable to quenching means comprising blowing boxes with nozzles or apertures supplied with air at low pressure from a suitable fan and for the quenching of glass which has been curved by allowing it to sag on a suitable peripheral frame.

In some circumstances it is desirable that the out of phase movement imparted to the quenching frames is of a smaller magnitude than the movement imparted to the quenching frames in the direction parallel to the generatrix of the curved glass sheet. Also it will be appreciated that the movements of the quenching frames in a direction parallel to the generatrix of the curved glass sheet may be out of phase.

The present invention is particularly useful in connection with glasses 3/16" or less in thickness which are more affected by inequalities of pressure. It may also be used with glasses of greater thickness, for instance glass of 1/4" thickness which is at present commonly used for automobile windscreens and backlights.

By the use of the present invention it is found that a substantially uniform toughening of the glass sheet is obtained, particularly at the curved portions, for example a bent-round end portion, of the glass sheet on account of the fact that a substantially even heat absorption from the opposed glass surfaces is maintained.

I claim:

1. A method of toughening a curved glass sheet comprising the steps of issuing a gaseous chilling medium from opposed quenching means as jets of gas directed on to both faces of a heated curved glass sheet, moving the opposed quenching means issuing chilling medium at the surfaces of the curved glass sheet in a periodic motion having a reciprocatory component in a direction substantially parallel to the chord to the mean path of the generatrix of a surface of the curved glass sheet to spread the chilling fluid over the surfaces of the heated curved glass sheet, and causing at least the opposed quenching means issuing chilling medium on to the curved surfaces of the glass sheet to move in opposed directions parallel to the said chord and in relation to the curved glass surfaces therebetween.

2. A method of toughening a curved glass sheet having a substantially linear central portion and sharply bent-round end portions, for example a windscreen or backlight for an automobile, comprising the steps of suspending the heated curved glass sheet between a pair of opposed quenching frames having nozzles arranged in a curve similar to the curvature of the glass sheet, issuing gaseous chilling medium from said opposed quenching frames as jets of gas directed to both faces of the heated curved glass sheet, simultaneously moving the opposed quenching frames in a periodic motion having a reciprocatory component in a direction substantially parallel to the chord to the mean path of the generatrix of a glass surface and controlling said periodic motion of the opposed quenching frames, always to move the opposed quenching frames, so that their components of movements parallel to said chord are in opposite directions and are so related to the curved glass surfaces between said opposed quenching frames, whereby the jets on each side of the glass sheet have their distances from the surfaces of the glass sheet similarly altered, and any tendency of the chilling fluid to rock the suspended glass sheet in a direction substantially parallel to the said chord is substantially eliminated.

3. A method according to claim 2 wherein the jets on both sides of the curved glass sheet are moved in periodic motions having corresponding components in a direction substantially parallel to the mean direction of the generatrix of the glass surface.

4. A method of toughening a glass sheet having at least one marginal section curvedly offset from its intermediate body section and having said intermediate body section extending substantially straight in a direction transverse to said marginal section, comprising the steps of projecting quenching jets of gaeous chilling medium from two opposed banks of nozzles against opposite faces of a heated curved glass sheet supported between the two banks of nozzles, each bank of nozzles following a contour substantially parallel to the curvature of the glass sheet, and while the two banks of nozzles are projecting gaseous chilling medium, subjecting the two banks to synchronized periodic phasically offset motions having components respectively of equal magnitudes but in opposite directions extending towards and away from said marginal section transversely thereof and substantially parallel to said intermediate body section to maintain the nozzles in any opposed sections of the banks substantially equally distant from the corresponding section of the glass sheet in alignment with the latter opposed nozzles.

5. Apparatus for toughening a curved glass sheet, comprising opposed quenching means for directing a chilling fluid onto the surfaces of a heated glass sheet supported therebetween, said quenching means having a curvature similar to the curvature of the glass sheet, supporting means for supporting the heated glass sheet between the said opposed quenching means, said quenching means extending in the general direction of curvature of the glass sheet as to be substantially parallel to said glass sheet in one phase of operation of said quenching means and driving means for imparting to the opposed quenching means motions having reciprocatory components in opposite directions to each other substantially parallel to the chord to the mean path of the generatrix of the surface of the glass sheet, whereby the pressures of the chilling fluid on the opposed curved surfaces of the glass sheet are maintained substantially in balance.

6. Apparatus for toughening a curved glass sheet, comprising opposed quenching frames having means for directing jets of chilling fluid onto the surfaces of a heated curved glass sheet supported therebetween and having a curvature similar to the curvature of the glass sheet, supporting means for supporting a heated curved glass sheet between the said opposed quenching frames, said quenching means extending in the general direction of curvature of the glass sheet as to be substantially parallel to said glass sheet in one phase of operation of said quenching means driving means for imparting to each of the opposed quenching frames a motion having a reciprocatory component in a direction substantially parallel to the chord to the mean path of the generatrix of the curvature of the glass sheet, and mechanical linkages connecting said driving means to each of the opposed quenching frames for ensuring movement of each of the said quenching frames in opposite directions to each other substantially parallel to the said chord.

7. Apparatus according to claim 6, wherein the opposed quenching frames have a configuration similar to the configuration of a glass sheet having a curvature such that at least one end of the glass sheet is tangential to a plane not less than 30° from the original plane of the glass sheet.

8. Apparatus according to claim 6, wherein the said driving means additionally imparts to the opposed quenching frames reciprocatory movement in a direction parallel to the mean direction of the generatrix of the glass surface, which reciprocatory movements are substantially in phase.

9. Apparatus according to claim 8, wherein the said driving means imparts to the opposed quenching frames movement of equal amplitude in the said two directions.

10. Apparatus according to claim 8, wherein the said driving means imparts to the opposed quenching frames a movement in the direction parallel to the mean direction of the generatrix of the glass surface of greater amplitude than the amplitude of the movement in the direction parallel to the chord defining the mean path of the said generatrix.

11. An apparatus for toughening a glass sheet having at least one marginal section curvedly offset from its intermediate body section, comprising means for supporting the glass sheet for toughening, two banks of nozzles facing opposite faces of the supported glass sheet, frames for supporting said banks of nozzles, so that each bank of nozzles follows a contour substantially parallel to the curvature of the supported glass sheet, said nozzles being adapted to project quenching jets of gaseous chilling medium from the two opposed banks against opposite faces of the supported glass sheet therebetween, and means operable while the two banks of nozzles are projecting gaseous chilling medium against the supported glass sheet, for subjecting the two frames to synchronized periodic phasically offset motions having components respectively of equal magnitudes but in opposite directions extending towards and away from said marginal section of the supported glass sheet transversely of said marginal section and substantially parallel to said intermediate body section, to maintain the nozzles in any opposed sections of the banks substantially equally distant from the corresponding section of the supported glass sheet in alignment with the latter opposed nozzles.

References Cited by the Examiner

UNITED STATES PATENTS 3,008,272   11/61   Black et al. _____ 65—104 X

FOREIGN PATENTS 586,497   3/47   Great Britain.
1,240,091   7/60   France.

DONALL H. SYLVESTER, *Primary Examiner.*